May 7, 1968   KEIZO NISHIMURA   3,381,408
FISH BASKET WITH FLOATING DOOR
Filed May 6, 1966
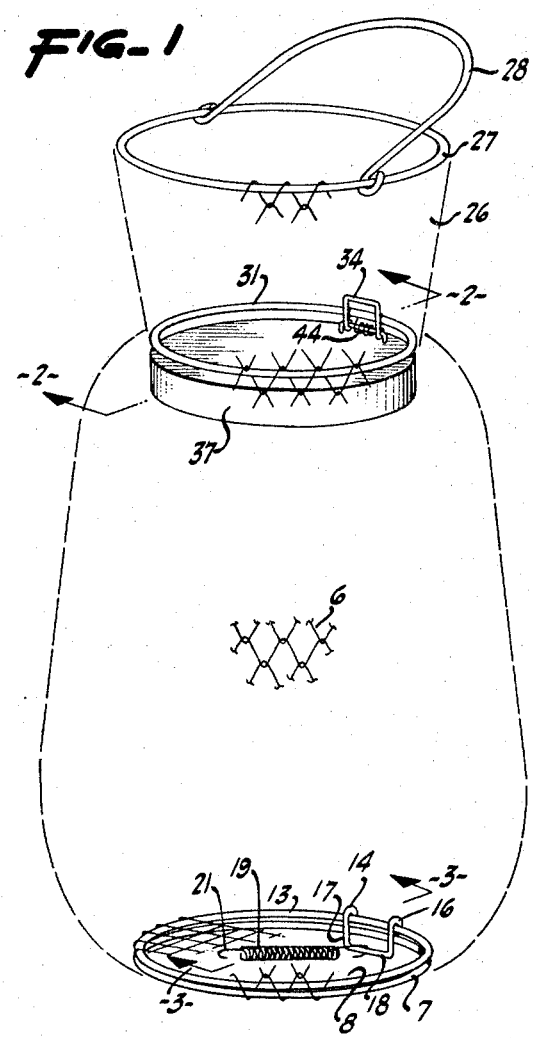
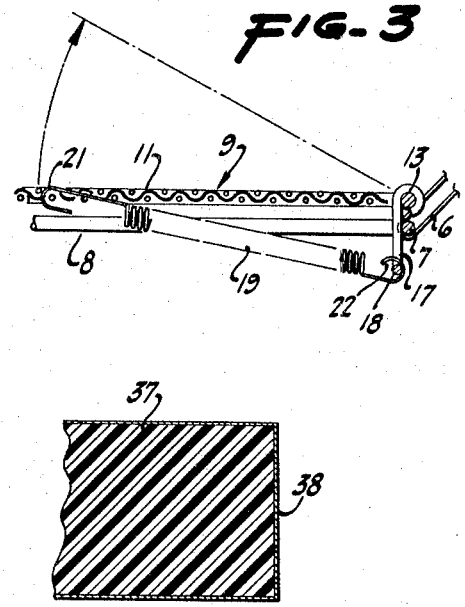
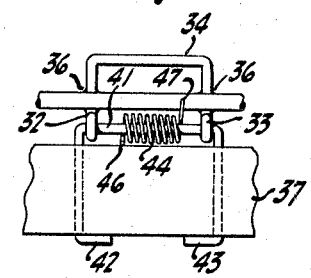
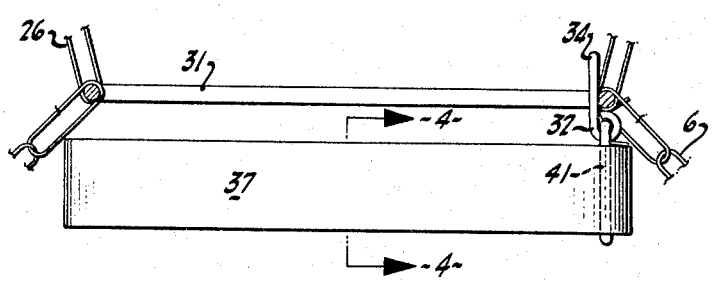
INVENTOR
KEIZO NISHIMURA
BY
Lothrop & West
ATTORNEYS

United States Patent Office 3,381,408
Patented May 7, 1968

3,381,408
FISH BASKET WITH FLOATING DOOR
Keizo Nishimura, Nadaku, Kobe, Japan, assignor to Soyo International Corp.
Filed May 6, 1965, Ser. No. 548,257
1 Claim. (Cl. 43—55)

ABSTRACT OF THE DISCLOSURE

A wire mesh fish basket has an upper opening of a certain size toward and from which a buoyant disk of larger size is movable, the disk alone being sufficiently buoyant to sustain in water both the disk and the basket itself, the disk being permanently hinged to the basket always to transmit the disk buoyancy to the basket and there being a lower opening in the basket through which the detached disk can be moved.

Fishermen often employ a reticulated or openwork confining means disposed in the water and segregating fish after they have been caught. One form of such device includes a wire mesh enclosing basket. The weight of the wire mesh is considerably heavier than the displaced water so that the basket needs to be tied in position in order that it not sink or drift away.

It is an object of my invention to provide a fish basket of mesh construction but which is arranged so that it will float in the water and can always be kept track of.

Another object of the invention is to provide a fish basket with a floating door so that the buoyancy of the door is sufficient to maintain the door itself and the remaining portions of the fish basket in a substantially floating condition.

Another object of the invention is to provide a fish basket with a floating door, the buoyancy of the door tending to keep the door closed at all times unless it is dislodged by a superior force.

Another object of the invention is to provide a fish basket with a floating door which can readily be replaced if necessary.

Another object of the invention is to provide a fish basket with a floating door of such compact configuration that it does not substantially interfere with collapsing of the basket.

Another object of the invention is in general to provide an improved fish basket with a floating door.

Other objects together with the foregoing are attained in the embodiment of the invention described in the accompanying description and illustrated in the accompanying drawings, in which:

FIGURE 1 is a perspective of a fish basket with a floating door in its normal position of use;

FIGURE 2 is a cross section, the plane of which is indicated by the lines 2—2 of FIG. 1;

FIGURE 3 is a cross section, the plane of which is indicated by the line 3—3 of FIGURE 1;

FIGURE 4 is a cross section, the plane of which is indicated by the line 4—4 of FIGURE 2; and FIGURE 5 is an elevation of a portion of the hinge and spring construction shown to an enlarged scale.

While the fish basket with floating door can be constructed in a number of different ways, it has successfully been constructed as shown herein. In this arrangement there is provided a wire mesh enclosure 6 having the mesh formed so that the basket can be contracted and expanded. As shown in FIGURE 1, the mesh is expanded and in that condition substantially defines a figure of revolution about a vertical axis, the figure being generally circular in cross section and being somewhat elongated. Near the bottom, the enclosure has a rim 7, preferably of wire, with which the mesh is interengaged and which surrounds a lower opening 8. The opening 8 is normally closed by a trap door 9, also of wire mesh 11, bounded by a stiff ring 13 of substantially the same diameter as the rim 7. One portion of the ring 13 is confined by hinge hooks 14 and 16 formed at the ends of a wire loop 17 welded or otherwise firmly secured to the rim 7 and depending therebelow to provide a cross bar 18.

With this arrangement, the bottom trap door can be swung inwardly at any time in order to afford free access through the lower opening 8. In order to urge the bottom trap door closed under normal circumstances, a spring 19 is provided with a hook 21 interengaged with the mesh 11 at one end and with a hook 22 seated upon the cross bar 18 at the other end. By this means the bottom door is normally urged into closed position but can be displaced inwardly to afford access through the enlarged lower opening 8.

The wire mesh enclosure 6 adjacent the upper end of the fish basket is converged inwardly somewhat and then is tapered outwardly to provide a conical neck 26 ending in a band 27 to which a bail 28 is secured. The reduced portion of the enclosure is in engagement with a hoop 31 preferably of wire formed into a circle and interengaged with the mesh and having a diameter somewhat less than the diameter of the lower opening 8. The hoop 31 also carries a pair of hinge eyes 32 and 33 formed at the ends of a loop 34 secured by welds 36 to the hoop 31 or is otherwise fixed therein.

Particularly in accordance with the invention, there is provided a buoyant disk 37 conveniently formed of polystyrene or similar foamed plastic material which is considerably lighter than water. Since the polystyrene foam is porous and is somewhat irregular on the surface, it is preferably encased in a plastic envelope 38 of relatively thin but smooth and impervious material. There results a permanently buoyant disk circular in configuration larger in diameter than the hoop 31 but small enough to pass easily through the opening 8.

In order to mount the disk 37 in appropriate position, it is pierced by a wire loop 41 clinched on the inner ends 42 and 43, passing through the material of the disk and looped through the hinge eyes 32 and 33. The disk 37 is thus supported for pivotal or swinging hinged movement between an open position extending into the extended basket and a closed position in close proximity to the hoop 31.

Under most circumstances when the mechanism, as so far described, is put into the water, the buoyancy of the disk 37 is sufficient to hold the disk in its upper, closed position against the hoop 31 or against the adjacent portions of the wire mesh enclosure. Sometimes the requirement is for the disk to be held more firmly closed and to be held closed when the basket is out of the water. For that and other reasons, I may also mount a spring 44 in connection with the hinging means to add to the upward force of the buoyant disk. The spring 44 is a wire helix encompassing the loop 41. It has one end 46 bearing against the disk 37 and has the other end 47 bearing against the hoop 31 or the adjacent wire mesh enclosure.

With this arrangement, when the fish basket is put into the water the floating door is of sufficient buoyancy not only to maintain the door itself in floating condition, but likewise to support the remainder of the fish basket so that it is always virtually in sight and adjacent the water surface. It is easy to gain access to the interior of the enclosure simply by manually depressing or swinging the disk 37, which is returned to its closed position either by its buoyancy alone, by the urgency of the spring 44 or by both of them acting together. At any time it is necessary to replace the disk 37, that can readily be done by working through the opening 8. When the structure is not to be employed but is to be stored, the entire mechanism can be collapsed into quite a flat package since the thickness of the disk 37 is not enough to constitute an objectionable bulk.

What is claimed is:

1. A fish basket with floating door comprising a collapsible wire mesh enclosure having an upper opening, a hoop of predetermined diameter engaged with said mesh and surrounding said upper opening, a generally flat disk of buoyant material and of more than said predetermined diameter disposed within said enclosure adjacent to and beneath said hoop, said disk being the sole sustaining member in water and being of sufficient buoyancy to sustain in water the weight of said wire mesh enclosure and of said disk itself, means hinging one edge of said disk to said hoop to continuously transmit said buoyancy of said disk through said hinging means to said hoop when said disk is in the water, said wire mesh enclosure having a lower opening larger than the diameter of said disk and a closure hinged to said enclosure, adjacent said lower opening, for inward swinging movement.

References Cited
UNITED STATES PATENTS

| | | | |
|---|---|---|---|
| 1,489,255 | 4/1924 | Lane | 43—55 |
| 2,030,793 | 2/1936 | Horne | 43—55 |
| 2,699,626 | 1/1955 | Bober et al. | 43—55 |
| 2,923,086 | 2/1960 | Metcalf | 43—55 |
| 2,968,887 | 1/1961 | Woolworth | 43—56 |
| 3,233,279 | 2/1966 | Edgar | 43—55 X |

HUGH R. CHAMBLEE, *Primary Examiner.*